(12) United States Patent
Kubota et al.

(10) Patent No.: US 9,535,474 B2
(45) Date of Patent: Jan. 3, 2017

(54) RENEWABLE ENERGY MANAGEMENT USING WEIGHTED LOAD PATTERNS

(71) Applicant: Kabushiki Kaisha Toshiba, Minato-ku (JP)

(72) Inventors: Kazuto Kubota, Kawasaki (JP);
Masahiko Murai, Hachioji (JP);
Tomohiko Tanimoto, Tama (JP);
Kiyotaka Matsue, Kawasaki (JP);
Kyosuke Katayama, Asaka (JP);
Masayuki Yamagishi, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 630 days.

(21) Appl. No.: 13/841,656

(22) Filed: Mar. 15, 2013

(65) Prior Publication Data
US 2013/0253719 A1    Sep. 26, 2013

Related U.S. Application Data

(63) Continuation of application No. PCT/JP2013/056348, filed on Mar. 7, 2013.

(30) Foreign Application Priority Data

Mar. 22, 2012 (JP) .................. 2012-065300

(51) Int. Cl.
*G06F 1/26* (2006.01)
*H02J 3/14* (2006.01)

(52) U.S. Cl.
CPC . *G06F 1/26* (2013.01); *H02J 3/14* (2013.01); *H02J 2003/143* (2013.01);
(Continued)

(58) Field of Classification Search
None
See application file for complete search history.

(56) References Cited

U.S. PATENT DOCUMENTS 5,761,083 A * 6/1998 Brown, Jr. ......... G05B 19/0421
340/12.53
6,772,052 B1 * 8/2004 Amundsen ............... H02J 3/14
307/35

FOREIGN PATENT DOCUMENTS

JP    2003-309928 A    10/2003
JP    2006-304402      11/2006
(Continued)

OTHER PUBLICATIONS

English translation of Takeuchi et al. Japanese Patent No. 2006304402.*
(Continued)

*Primary Examiner* — Mohammad Ali
*Assistant Examiner* — Bernard G Lindsay
(74) *Attorney, Agent, or Firm* — Oblon, McClelland, Maier & Neustadt, L.L.P.

(57) ABSTRACT

According to one embodiment, energy manager includes first estimator, second estimator, creator and controller. First estimator estimates power amount of power generator. Second estimator estimates energy demand. Creator creates schedule of devices based on estimated power amount and energy demand. Controller controls the devices based on the schedule. Second estimator includes storage, extractor and calculator. Storage accumulates load data. Extractor extracts load patterns including different load data. Calculator calculates weight for each of extracted patterns. Creator includes simulator and scheduler. Simulator simulates evaluated value of each schedule based on the pattern and weight. Scheduler creates schedule based on evaluated value.

9 Claims, 7 Drawing Sheets

(52) U.S. Cl.
CPC ....... *Y02B 70/3225* (2013.01); *Y02B 70/3266* (2013.01); *Y04S 20/222* (2013.01); *Y04S 20/242* (2013.01)

(56) References Cited

FOREIGN PATENT DOCUMENTS

| | | |
|---|---|---|
| JP | 2010-124644 | 6/2010 |
| JP | 2011-092002 A | 5/2011 |

OTHER PUBLICATIONS

International Search Report & Written Opinion issued Jun. 11, 2013 in Application No. PCT/JP2013/056348 (With English Translation).
T. Shimada et al., "Isolation Forecasting Using Weather Forecast with Weather Change Patterns", IEEJ Trans. PE, vol. 127, No. 11, 2007, pp. 1219-1225 with English Abstract.
International Preliminary Report on Patentability and Written Opinion issued Oct. 2, 2014, in International application No. PCT/JP2013/056348 (English translation only).
International Search Report issued Jun. 11, 2013, in International Application No. PCT/JP2013/056348.
Extended Search Report issued Aug. 31, 2015 in European Patent Application No. 13722272.5.

\* cited by examiner

RENEWABLE ENERGY MANAGEMENT USING WEIGHTED LOAD PATTERNS

CROSS-REFERENCE TO RELATED APPLICATIONS

This application is a Continuation Application of PCT Application No. PCT/JP2013/056348, filed Mar. 7, 2013 and based upon and claiming the benefit of priority from Japanese Patent Application No. 2012-065300, filed Mar. 22, 2012, the entire contents of all of which are incorporated herein by reference.

FIELD

Embodiments described herein relate generally to an energy management apparatus for managing energy consumed in, for example, a house, an energy management method and computer-readable medium.

BACKGROUND

In recent years, new energy devices such as a Photovoltaic (PV) unit, a battery and a fuel cell (FC) are being introduced in houses. Technologies for HEMS (Home Energy Management Systems) or energy management apparatuses have also extensively been developed. Using technologies of this type enables to implement energy use optimization, energy saving, and cost reduction in customers such as houses.

Many energy management apparatuses estimate an amount of energy to be consumed by energy consuming devices and creates the operation schedules of home appliances, energy storage devices, energy generation devices, and the like (to be generically referred to as electrical devices hereinafter) based on the estimation result.

The energy management apparatus creates the operation schedule of an electrical device based on the estimated value of load electric energy (to be referred to as an estimated load hereinafter). Hence, if the estimation is wrong, it is impossible to create an appropriate operation schedule. For example, assume that a user has two life patterns: a pattern in which he/she goes out during the daytime, and a pattern in which he/she stays at home during the daytime. If an algorithm for the going-out pattern is used to create the operation schedule of an electrical device in the user's home, the estimated load for the at-home case is not accurate. Hence, the operation schedule is not appropriate. If a load estimation algorithm for the at-home pattern is used, the operation schedule in the going-out case is not appropriate.

The estimated loads in both patterns may be added with weighting coefficients such as at-home and going-out frequencies and averaged. However, an operation schedule created based on such an estimated load is eventually inappropriate for both the at-home pattern and the going-out pattern.

DETAILED DESCRIPTION

In general, according to one embodiment, an energy management apparatus includes a power generation estimation unit, a demand estimation unit, a creation unit and a controller. The power generation estimation unit estimates a power generation amount of a power generation apparatus using a renewable energy. The demand estimation unit estimates an energy demand of an electrical device of a customer. The creation unit creates an operation schedule of the electrical device based on the estimated power generation amount and energy demand. The controller controls the electrical device based on the operation schedule. The demand estimation unit includes a storage unit, an extraction unit and a calculation unit. The storage unit accumulates load data representing a result of a load of the electrical device. The extraction unit extracts a plurality of load patterns including a plurality of different load data from the accumulated load data. The calculation unit calculates a weight based on a predetermined standard for each of the extracted load patterns. The creation unit includes a simulator and a schedule creation unit. The simulator simulates, using a predetermined algorithm, an evaluated value of each operation schedule based on the extracted load pattern and the weight of the load pattern. The schedule creation unit creates the operation schedule based on the evaluated value.

Figure 1:
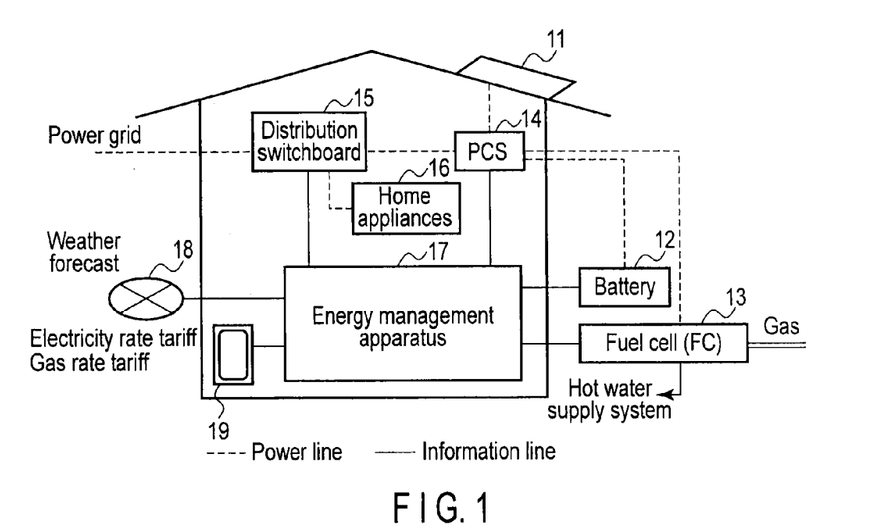
FIG. 1 is a block diagram exemplary showing a system to which an energy management apparatus according to an embodiment is applicable.

FIG. 1 is a block diagram exemplary showing a system to which an energy management apparatus according to an embodiment is applicable. The system shown in FIG. 1 includes a PV unit 11, a battery 12, a fuel cell (FC) 13, a power conditioning system (PCS) 14, a distribution switchboard 15, home appliances 16 (including a plurality of electrical devices), and an energy management apparatus 17.

The PV unit 11 generates power from sunlight. The battery 12 is charged with the power and discharged. The fuel cell 13 generates power and heat using a gas as a fuel. The distribution switchboard 15 supplies the power supplied from a power grid to the home appliances 16 via power lines. The power from the power lines may charge the battery 12.

The PCS 14 converts DC power generated by the PV unit 11, the battery 12, or the fuel cell 13 into AC power and supplies it to the distribution switchboard 15. If the electric energy supplied from the PCS 14 is larger than the power consumption of the home appliances 16, dump power is sold to a power company through the power grid.

The energy management apparatus 17 communicates with the Internet 18, a user terminal 19, the distribution switchboard 15, the PCS 14, the battery 12, and the fuel cell 13 through information lines. The energy management apparatus 17 also manages the battery 12, the fuel cell 13, the PCS 14, the distribution switchboard 15, and the like based on information acquired by the communication, and controls their operations.

The energy management apparatus 17 acquires an weather forecast, an electricity rate tariff, and a gas rate tariff from the Internet 18. The user inputs information such as the frequency of electrical device operation schedule creation by the energy management apparatus 17 from the user terminal 19 to the energy management apparatus 17. The energy management apparatus 17 acquires the power consumption of the home appliances 16 from the distribution switchboard 15. The energy management apparatus 17 acquires the power generation amount (PV power generation amount) of the PV unit 11 from the PCS 14.

The energy management apparatus 17 acquires charge power, discharge power, and SOC (State Of Charge) from the battery 12. The energy management apparatus 17 also outputs a charge instruction or a discharge instruction to the battery 12.

The energy management apparatus 17 acquires the power generation amount and the heat generation amount from the fuel cell 13. The energy management apparatus 17 also outputs a power generation instruction or a heat generation instruction to the fuel cell 13. Note that the above-described pieces of information are merely examples, and the energy management apparatus 17 can acquire and output various kinds of information in addition to those pieces of information.

Figure 2:
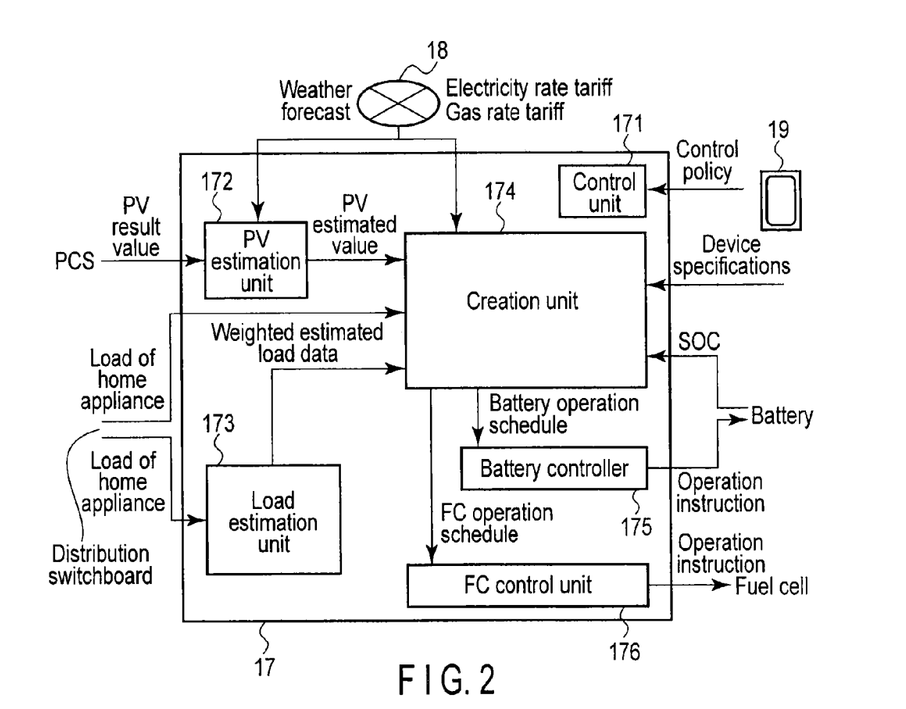
FIG. 2 is a functional block diagram showing an example of an energy management apparatus 17.

FIG. 2 is a functional block diagram showing an example of the energy management apparatus 17 shown in FIG. 1. The energy management apparatus 17 includes a control unit 171, a PV estimation unit 172, a load estimation unit 173, a creation unit 174, a battery controller 175, and an FC control unit 176.

The control unit 171 controls the energy management apparatus 17 in accordance with a control policy input from the user terminal 19. For example, if the user wants the operation schedules to be revised once an hour, the energy management apparatus 17 creates the operation schedules of, the battery 12 and the fuel cell 13 once an hour. The battery 12 and the fuel cell 13 are then given operation instructions based on the operation schedules.

Figure 3:
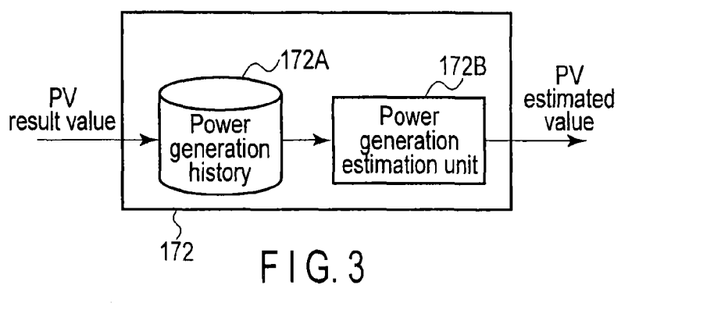
FIG. 3 is a functional block diagram showing an example of a PV estimation unit 172.

As shown in FIG. 3, the PV estimation unit 172 includes a storage unit 172A and a power generation estimation unit 172B. The storage unit 172A stores the past result value of the PV power generation amount as a history. The power generation estimation unit 172B acquires the result value of the PV power generation amount from the storage unit 172A and acquires a weather forecast from the Internet 18. The power generation estimation unit 172B generates the estimated value (PV estimated value) of the PV power generation amount based on the result value of the PV power generation amount and the weather forecast. For example, a method of estimating an amount of solar irradiation from a weather forecast every three hours is known. Hence, the PV estimated value can be calculated using the method.

Figure 4:
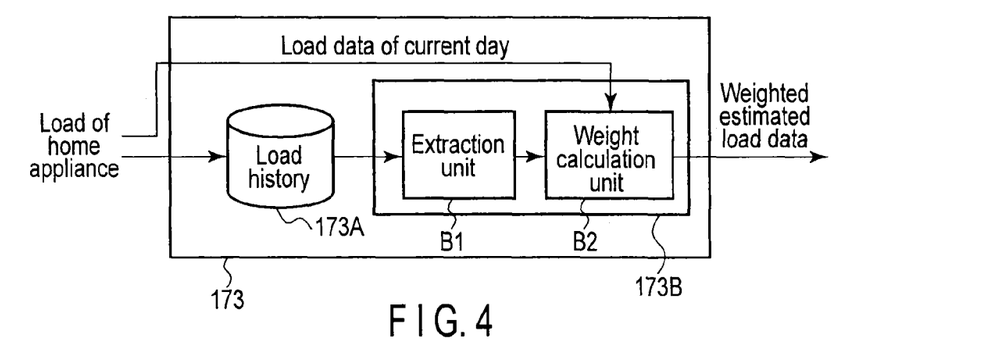
FIG. 4 is a functional block diagram showing an example of a load estimation unit 173.

As shown in FIG. 4, the load estimation unit 173 includes a storage unit 173A and an arithmetic unit 173B. The storage unit 173A accumulates the past result value (load data) of the load of the home appliances 16 as a history. The arithmetic unit 173B acquires the load data of the home appliances 16 from the storage unit 173A and generates a plurality of weighted estimated load data. Details will be described later.

Figure 5:
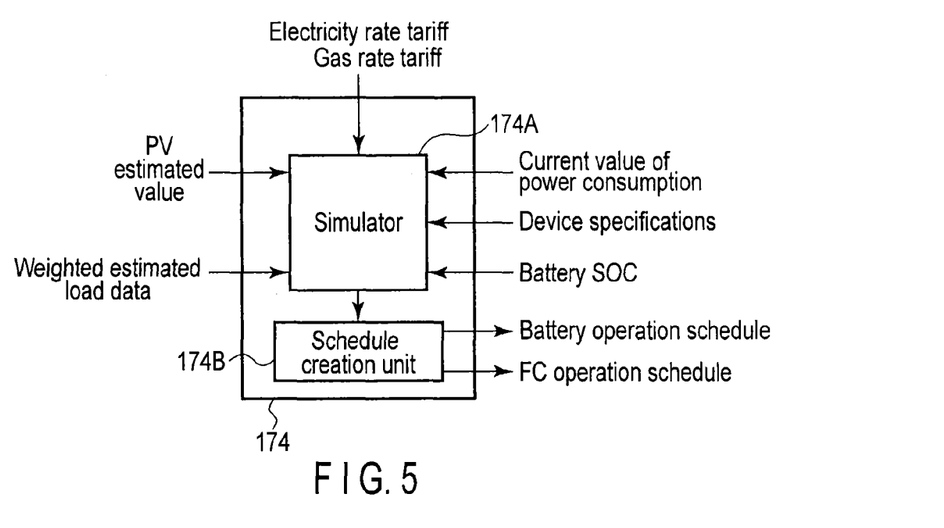
FIG. 5 is a functional block diagram showing an example of a creation unit 174.

As shown in FIG. 5, the creation unit 174 includes a simulator 174A and a schedule creation unit 174B. The schedule creation unit 174B creates the operation schedule (battery operation schedule) of the battery 12 and the operation schedule (FC operation schedule) of the fuel cell 13 based on, for example, the PV estimated value, the current value of the load of the home appliances 16, the plurality of weighted estimated load data, the electricity rate tariff, the gas rate tariff, the specifications of the respective home appliances 16, and the SOC of the battery 12. Details will be described later.

The battery controller 175 gives the battery 12 an operation instruction based on the battery operation schedule. The FC control unit 176 gives the fuel cell 13 an operation instruction based on the FC operation schedule.

Processing of the load estimation unit 173 will be described next in detail. The arithmetic unit 173B acquires load data at an arbitrary point of time from the storage unit 173A and calculates weighted estimated load data.

The arithmetic unit 173B includes an extraction unit B1 and a weight calculation unit B2. The extraction unit B1 extracts load data before and after a control target time of a past day from data acquired from the storage unit 173A.

The weight calculation unit B2 calculates, from a set including load data up to the control target time of the current day and load data before and after the control target time of a past day, the weight for each set based on a predetermined standard. The calculated weight is associated with each load data set, and the set of both data is output as weighted estimated load data.

Assume that the control target time is 8:00 am, and the load is estimated every hour of 24 hrs from 8:00 am. The storage unit 173A is assumed to accumulate the load data of a target customer every other hour.

The extraction unit B1 extracts, from load data, load data $Li[t]$ for 24 hrs before and after 8:00 am (a total of 48 hrs) of an arbitrary past date (Li: t=−24 to 24, i=1 to N, N is the number of sequences extracted from the load data). Load data before the control target time in each sequence is represented by $Li-$, and load data after the control target time is represented by $Li+$. A load data set of each date will be referred to as a load pattern.

The load pattern of the target day is represented by $Ltoday[t]$ (t=−24 to 24). Load data before the control target time of the target day, that is, $Ltoday[t]$ (t=−24 to 0) is represented by $Ltoday-$, and load data after the control target time, that is, $Ltoday[t]$ (t=1 to 24) is represented by $Ltoday+$. $Ltoday+$ corresponds to the load pattern (estimated load pattern) to be estimated. Li (i=1 to N) and Ltoday are transferred to the weight calculation unit B2. In this case, i (i=1 to N) is an index used to discriminate load patterns.

Figure 6:
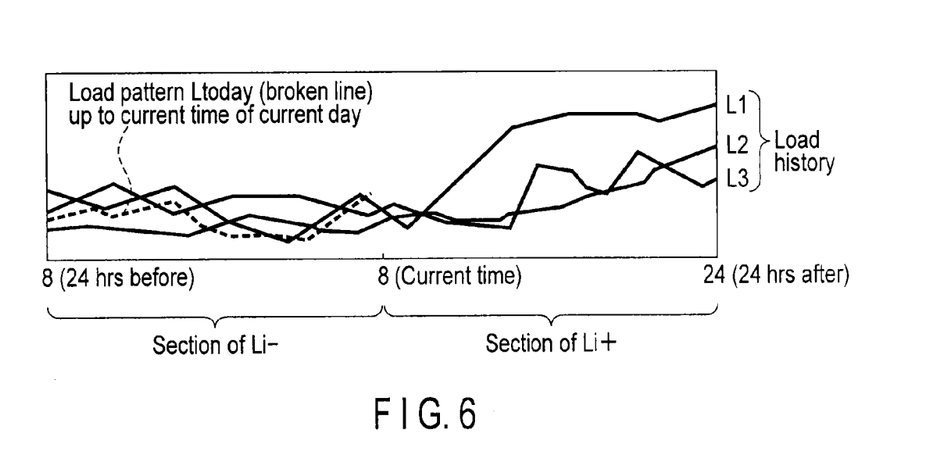
FIG. 6 is an example of a graph showing a plurality of load patterns.

FIG. 6 shows load patterns L1, L2, and L3 of three different days (N=3) and the load pattern $Ltoday-$ up to the current time of the current day. L1, L2, and L3 are indicated by solid lines, and $Ltoday-$ is indicated by a dotted line. Note that the control target time and the current time can be the same.

The weight calculation unit B2 calculates a weight $Wi$ of $Li+$. First, the weight calculation unit B2 calculates a standard deviation $\sigma[t]$ (t=−24 to 0) using all i (=1 to N) for $Li-$ of each time. Next, the weight calculation unit B2 calculates $Wi$ based on the equation (1).

$$Wi = \prod_{t=-24}^{0} \frac{1}{\sqrt{2\pi\sigma[t]^2}} \exp\left(-\frac{(Ltoday[t] - Li[t])^2}{2\sigma[t]^2}\right) \quad (1)$$

The set of weight Wi and Li+ (i=1 to N) is transferred to the creation unit 174 as weighted estimated load data.

Wi' calculated by the following method may be used in place of Wi. The load patterns Li+ of N sets are classified into the values of weekdays and the values of holidays as Lwj+ and Lhk+ (j=1 to N1, k=1 to N2, N1+N2=N), respectively. An index w represents a weekday, and an index h represents a holiday. The weekdays and the holidays can be discriminated based on, for example, the day at 12:00 of Li+.

To obtain Wi', the weight calculation unit B2 calculates the probability distributions of Lwi+ and Lhi+ for each time t=1 to 24. As the probability distribution, for example, a normal distribution can be used. The mean and standard deviation of each time t are represented by mw[t] and σw[t] for a weekday and mh[t] and σh[t] for a holiday. Using the normal distribution, Wi' can be calculated based on the equations (2) and (3).

$$Wi' = Wi \times \prod_{t=1}^{24} \frac{1}{\sqrt{2\pi\sigma w[t]^2}} \exp\left(-\frac{(Li[t] - mw[t])^2}{2\sigma w[t]^2}\right) \quad \text{(weekday)} \quad (2)$$

$$Wi' = Wi \times \prod_{t=1}^{24} \frac{1}{\sqrt{2\pi\sigma h[t]^2}} \exp\left(-\frac{(Li[t] - mh[t])^2}{2\sigma h[t]^2}\right) \quad \text{(holiday)} \quad (3)$$

Wi, and/or Wi' represents the likelihood of Li+. As indicated by equations (2) and (3), the weights are calculated using a rule that the equation to be used is changed between a weekday and a holiday. However, this is merely an example. Alternatively, a rule that time-series data is clustered by the distance, and the time-series data are classified into clusters may be applied. The rule can be created using, for example, a decision tree.

Figure 7:
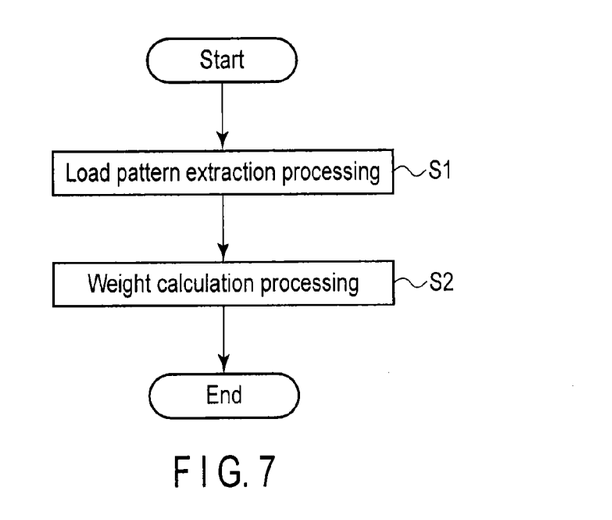
FIG. 7 is a flowchart showing an example of the processing procedure of the load estimation unit 173.

FIG. 7 is a flowchart showing an example of the processing procedure of the load estimation unit 173. Referring to FIG. 7, first, load pattern extraction processing is performed (step S1). Next, weight calculation processing is executed (step S2), and the series of processes is completed.

Figure 8:
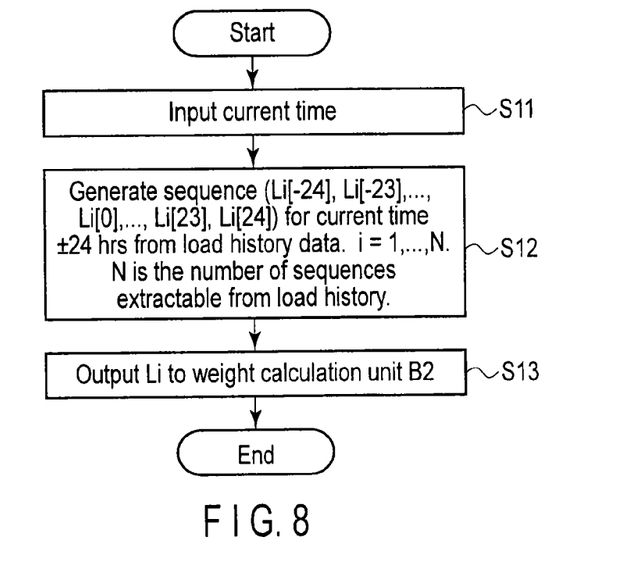
FIG. 8 is a flowchart showing an example of the processing procedure of step S1 shown in FIG. 7.

FIG. 8 is a flowchart showing an example of the processing procedure of step S1 shown in FIG. 7. Referring to FIG. 8, when the current time is input (step S11), the extraction unit B1 extracts the load data for current time±24 hrs from the storage unit 173A and creates a sequence (Li[−24], Li[−23], . . . , Li[0], . . . , Li[23], Li[24]) (step S12). In this case, i=1, . . . , N, and N represents the number of generated sequences. The extraction unit B1 subsequently transfers Li to the weight calculation unit B2 (step S13), and the series of processes ends.

Figure 9:
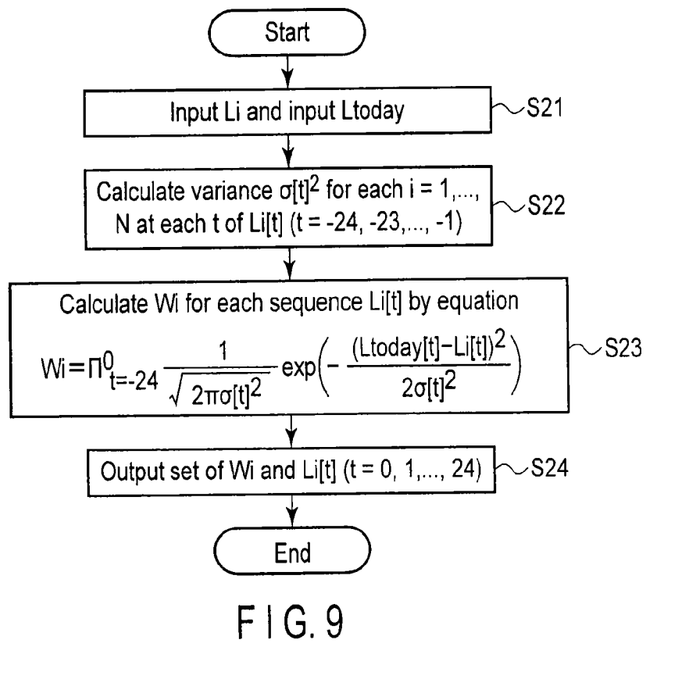
FIG. 9 is a flowchart showing an example of the processing procedure of step S2 shown in FIG. 7.

FIG. 9 is a flowchart showing an example of the processing procedure of step S2 shown in FIG. 7. Referring to FIG. 9, when Li and Ltoday are input (step S21), the weight calculation unit B2 calculates a variance σ[t]² for each i=1, . . . , N at each t of Li[t] (t=−24, −23, . . . , −1). Next, the weight calculation unit B2 calculates Wi for each sequence Li−[t] using equation (1) (step S23). The weight calculation unit B2 outputs the set of Wi and Li[t] (t=0, 1, . . . , 24) (weighted estimated load data) (step S24), and the series of processes ends.

Processing of the creation unit 174 will be explained next. The description will be made assuming that the operation schedule is calculated every hour.

Processing of the simulator 174A of the creation unit 174 will be described first. The simulator 174A executes arithmetic processing based on a predetermined algorithm. In this embodiment, the algorithm is assumed to use the following variables.

Li[t]: load data of sequence i (t=1 to 24)

Wi: weight of sequence Li[t]

PV[t]: PV power generation estimated value for 24 hrs ahead (t=1 to 24)

Cp[t]: electricity price for 24 hrs ahead (the electricity price upon selling and that upon buying can be different) (t=1 to 24)

Cg: gas rate

SOC[0]: SOC of current time this algorithm outputs the following variables.

SOC[1]: SOC instruction value 1 hr after eFC[1]: FC generated electric energy instruction value for 1 hr ahead The simulator 174A first creates a combination (SOC[1], eFC[1]) of SOC[1] (values that can be taken on are 0, . . . , SOCmax) and eFC[1] (values that can be taken on are 0, . . . , eFCmax). SOC[1] and eFC[1] can take on values in steps of, for example, 10. (SOC[1], eFC[1]) take on values of, for example, (25, 700).

Similarly, the simulator 174A creates a combination (SOC[t], eFC[t]) of SOC[t] (values that can be taken on are 0, . . . , SOCmax) and eFC[t] (values that can be taken on are 0, . . . , eFCmax) for t (t=2 to 24). (SOC[2], eFC[2]) take on values of, for example, (30, 700). SOC[t] and eFCl[t] can also take on values in steps of 10. A combination of (SOC[t], eFC[t]) for t=2 to 24 is (SOCall, eFCall). (SOCall, eFCall) can be represented by, for example, (30, 700) (35,700) (40,700) . . . (30,0)(30,0).

This is a combination of instances (SOC[2], eFC[2]), (SOC[3], eFC[3]), (SOC[4], eFC[4]), . . . , (SOC[23], eFC[23]), (SOC[24], eFC[24]) from the head.

Next, for certain (SOCall, eFCall), the simulator 174A calculates the following amounts for t=1 to 24.

Power[t]=Li[t]−PV[t]−eBAT[t]−eFC[t]

Price[t]=Power[t]*Cp[t]*h+fFC[t]*Cg eBAT[t]=(SOC[t]−SOC[t−1])*α

α is a parameter to convert a change in the SOC into power. For example, in a 4-kWh battery, α is 40. When the SOC changes from 20% to 30%, this battery is charged to an electric energy of (30−20)*40=400 Wh. An average charge power eBAT[t] is 400 W.

h is a coefficient used to convert power into an electric energy. When the power is calculated every hour, the coefficient h is 1. fFC[t] is a gas amount necessary for generating a power eFC[t]. The gas rate can be calculated by multiplying fFC[t] by Cg.

Next, the simulator 174A calculates Priceall by totaling Price[t] for t=1 to 24. If Power[t] is negative, the power is sold to the grid side (power selling). Under the constraint that the power selling amount at the time of PV power generation cannot exceed the PV power generation amount, a constraint PV[t]>−Power[t] is provided. If at least one of the constraints is not satisfied for all t, the simulator 174A does not calculate the Price of the combination (SOCall, eFCall).

The simulator 174A calculates Priceall for all combinations (SOCall, eFCall), and the minimum value of Priceall is set as a representative price PP[i] of a certain combination (SOC[1], eFC[1]). The simulator 174A calculates PP[i] for all i in each (SOC[1], eFC[1]). The calculated values indicate the value distribution of (SOC[1], eFC[1]).

If the strategy associated with the operation schedules is to minimize the expected value of light and fuel expenses, the simulator 174A obtains (SOC[1], eFC[1]) for which the average for all i of Wi*PP[i] is minimum as the output of the algorithm.

Under the constraint that the light and fuel expenses need to be lower than a predetermined amount at a probability of 95%, the weight Wi of PP[i] is added in descending order of price. (SOC[1], eFC[1]) for which the average for all i of Wi*PP[i] is minimum is selected from (SOC[1], eFC[1]) for which PP[i] when the sum of weights Wi exceeds 5% is lower than a predetermined amount as the output of the algorithm.

Note that if a plurality of sequences of PV estimated values are given, the above-described calculation is performed for each sequence, and the value distribution is calculated in consideration of the weights of the PV estimated values.

Figure 10:
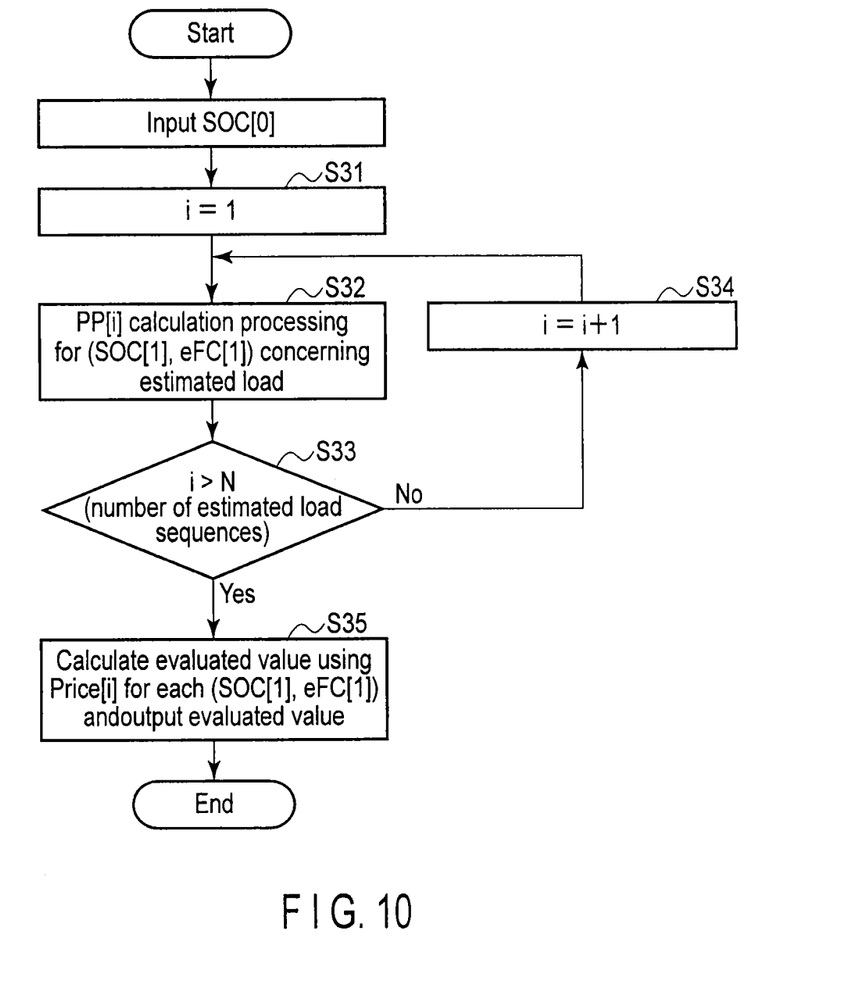
FIG. 10 is a flowchart showing an example of the processing procedure of a simulator 174A.
Figure 11:
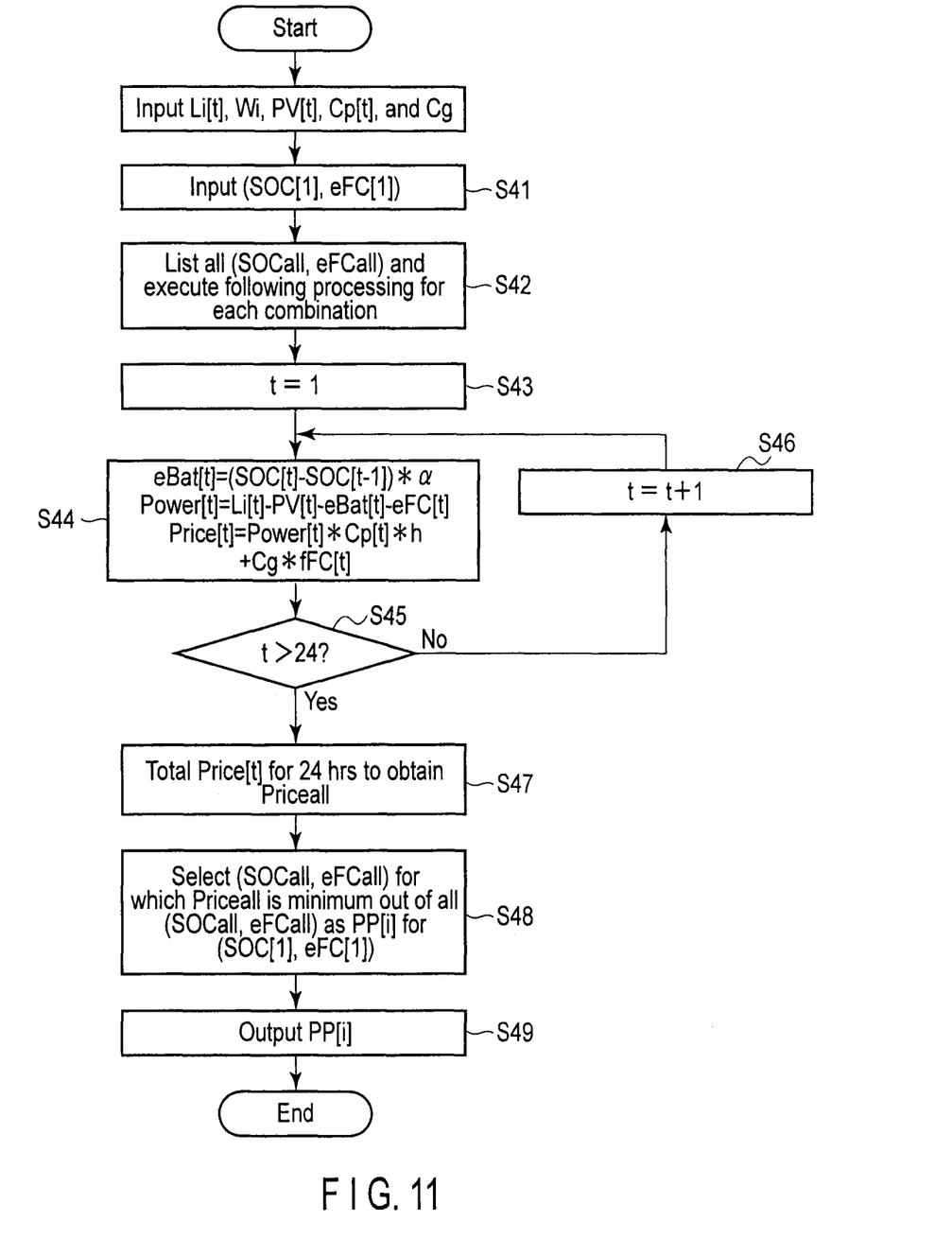
FIG. 11 is a flowchart showing an example of the processing procedure of the creation unit 174.

The above-described contents are shown in the flowcharts of FIGS. 10 and 11. FIG. 10 illustrates an example of the processing procedure of the simulator 174A. First, after SOC[0] is given, the simulator 174A increments i and acquires SOC[i] (i=1) (step S31). Next, the simulator 174A calculates PP[i] for (SOC[1], eFC[1]) concerning the estimated load i (step S32).

The simulator 174A determines whether i>N (N is the number of sequences of estimated loads) (step S33). If i>N does not hold, i is incremented (step S34), and the processing procedure returns to step S32. If i>N holds, the simulator 174A calculates an evaluated value using Price[i] of each (SOC[1], eFC[1]) (*) and outputs it (step S35). In step S35, for example, the average for i of PP[i]*Wi is calculated as the evaluated value of (SOC[1], eFC[1]).

FIG. 11 illustrates an example of the processing procedure of the schedule creation unit 174B. Referring to FIG. 11, when the variables Li[t], Wi, PV[t], Cp[t], and Cg and (SOC[1], eFC[1]) are input (step S41), the schedule creation unit 174B lists all (SOCall, eFCall) and executes the following processing for each combination (step S42).

First, setting t=1 (step S43), the schedule creation unit 174B calculates the following amounts (step S44).

$$eBat[t]=(SOC[t]-SOC[t-1])*\alpha$$

$$Power[t]=Li[t]-PV[t]-eBat[t]-eFC[t]$$

$$Price[t]=Power[t]*Cp[t]*h+Cg*fFC[t]$$

Next, the schedule creation unit 174B determines whether t>24 (step S45). If t has not reached 24, (t+1) is set in t (step S46), and the calculation in step S44 is executed. If t>24 is true in step S45, the schedule creation unit 174B totals Price[t] for 24 hrs to obtain Priceall (step S47).

Next, the schedule creation unit 174B selects (SOCall, eFCall) for which Priceall is minimum out of all (SOCall, eFCall) as PP[i] for (SOC[1], eFC[1]) (step S48) and outputs PP[i] (step S49).

The above-described method is an example of the combination optimization problem. If a branch and bound method is used, the processing time can be shortened. In a case in which obtaining a quasi optimum solution suffices, simulated annealing or the like can be used. A genetic algorithm or the like is also usable.

Next, the schedule creation unit 174B creates the operation schedules of the battery 12 and the fuel cell 13 for the output (SOC[1], eFC[1]) of the simulator 174A and gives the operation schedules to the battery controller 175 and the FC control unit 176, respectively.

The battery controller 175 creates a control instruction based on the operation schedule SOC[t] of the battery 12 received from the schedule creation unit 174B and gives it to the battery 12. More specifically, for example, an instruction to "set the SOC per hr of the battery to 30%" is given to the battery 12 using a predetermined control command.

The FC control unit 176 creates a control instruction based on the operation schedule eFC[t] of the fuel cell 13 and gives it to the fuel cell 13. More specifically, for example, an instruction to "operate the fuel cell at 700 W" is given to the fuel cell 13 using a predetermined control command. The battery 12 and the fuel cell 13 can thus be operated in accordance with the optimized operation schedules.

Figure 12:
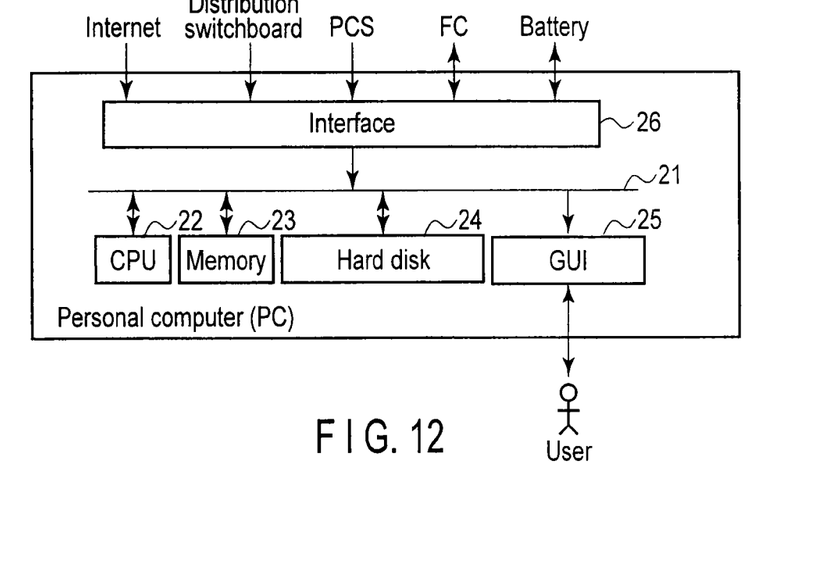
FIG. 12 is a functional block diagram showing an example of a personal computer capable of implementing the functions of the energy management apparatus 17 by software.

The processing of each block of the energy management apparatus 17 can be executed by causing a personal computer (PC) shown in FIG. 12 to execute a program including the processes shown in the flowcharts of FIGS. 7, 8, 9, 10, and 11.

The personal computer shown in FIG. 12 includes a CPU (Central Processing Unit) 22, a memory 23 used to execute a program, a hard disk 24 used to store program data, a GUI (Graphical User Interface) 25 that accepts a user input operation, and an interface 26, all of which are connected to a bus 21. The battery 12, the fuel cell 13, the PCS 14, the distribution switchboard 15, and the Internet 18 are connected to the interface 26.

That is, the program to control the energy management apparatus 17 is stored in the hard disk 24, extracted on the memory 23 at the time of execution, and processed by the CPU 22. This program also includes a function of communicating with the Internet 18, the distribution switchboard 15, the PCS 14, the fuel cell 13, and the battery 12 via the interface 26. This program also controls the fuel cell 13 and the battery 12 via the interface 26. This program also accepts a user input via the GUI 25.

As described above, according to this embodiment, a plurality of weighted estimated load data are calculated based on the PV estimated value and the history of the loads of the home appliances 16. The operation schedules of the battery and the fuel cell are created based on the plurality of weighted estimated load data. The battery and the fuel cell can be operated based on the operation schedules. The operation schedules can also be corrected as needed. Hence, according to this embodiment, it is possible to greatly reduce the risk of wrong estimation and more efficiently manage energy consumption.

(Other Embodiments)

In general, a behavior in the future is supposed to depend on the most recent behavior. According to this principle, a more accurate operation schedule can be created by using more load data close to the target time and less load data distant from the control target time. This technical idea will be disclosed in another embodiment.

Figure 13:
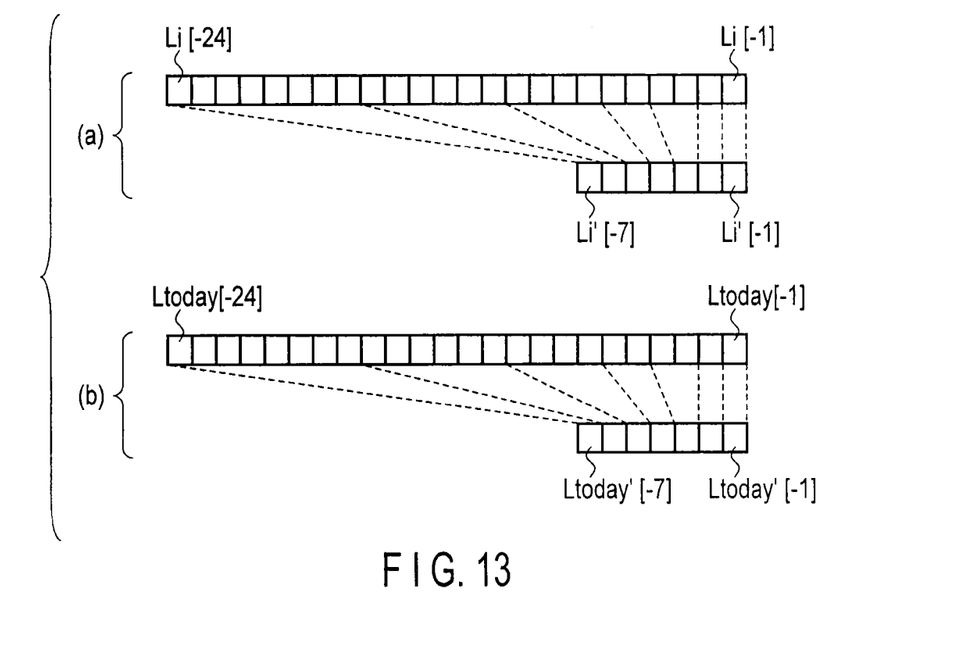
FIG. 13 is a flowchart showing an example of a processing procedure according to another embodiment.

FIG. 13 is a conceptual view for explaining weight calculation not to largely be affected by the distant past. In the above-described embodiment, the value in each hour is used as the load data Li–. Instead, in the other embodiment, the step of the time of the load data Li– is changed. That is, the step of the time of the load data Li– is changed such that the number of samples of the load data Li− close to the target time becomes large, and the number of samples of the load data Li− far from the target time becomes small.

As shown in FIG. 13(a), for example, Li[−24] to Li[−17] are integrated to L'i[−7]. Li[−16] to Li[−11] are integrated to L'i[−6]. Li[−10] to Li[−7] are integrated to L'i[−5]. Li[−6] and Li[−5] are integrated to L'i[−4]. Li[−4] and Li[−3] are integrated to L'i[−3]. Li[−2] and Li[−1] are directly used as L'i[−2] and L'i[−1], respectively. L'i-including the seven data is calculated.

For Ltoday− as well, L'today− including seven data is calculated, as shown in FIG. 13(b). Wi is calculated by the same weight calculation as in the above-described embodiment using L'i− (i=1, . . . , N) and L'today−.

Integrating load data of the distant past on the time base while fractionating load data of the close past on the time base, as in the other embodiment, in stead of equally handling the load data in the unit time, allows to perform weight calculation not to largely be affected by the distant past. It is therefore possible to properly reduce the risk of wrong load estimation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An energy management apparatus comprising:
a power generation estimator configured to estimate a power generation amount of a power generation apparatus using a renewable energy;
a demand estimator configured to estimate an energy demand of an electrical device of a customer;
a creator configured to create an operation schedule of the electrical device based on the estimated power generation amount and energy demand; and
a controller configured to control the electrical device based on the operation schedule, wherein
the demand estimator comprises:
a storage configured to accumulate load data representing a result of a load of the electrical device;
an extractor configured to extract a plurality of load patterns including a plurality of different load data from the accumulated load data; and
a calculator configured to calculate a weight based on a predetermined standard for each of the extracted load patterns, and
the creator comprises:
a simulator configured to simulate, using a predetermined algorithm, an evaluated value of each operation schedule based on the extracted load pattern and the weight of the load pattern; and
a scheduler configured to create the operation schedule based on the evaluated value, and wherein
the extractor extracts a plurality of load data for a predetermined period before and after the same time of a past day as a current time, and
the calculator calculates the weight by computing differences between load data up to the current time of a current day and the extracted load data such that the weight decreases as the differences increase.

2. The energy management apparatus of claim 1, wherein the extractor increases a time step for collection of the load data to decrease a number of samples of the load data in a first time period relative to a second time period that is between the first time period and the current time.

3. The energy management apparatus of claim 1, wherein the simulator simulates a cost of each operation schedule as the evaluated value, and the scheduler creates the operation schedule that minimizes the cost.

4. An energy management method comprising:
estimating a power generation amount of a power generation apparatus using a renewable energy;
estimating an energy demand of an electrical device of a customer;
creating an operation schedule of the electrical device based on the estimated power generation amount and energy demand; and
controlling the electrical device based on the operation schedule, wherein
the estimating an energy demand comprises:
extracting a plurality of load patterns including a plurality of different load data from load data accumulated in a storage unit configured to accumulate the load data representing a result of a load of the electrical device; and
calculating a weight based on a predetermined standard for each of the extracted load patterns, and
the creating comprises:
simulating, using a predetermined algorithm, an evaluated value of each operation schedule based on the extracted load pattern and the weight of the load pattern; and
creating the operation schedule based on the evaluated value,
wherein a plurality of load data for a predetermined period before and after the same time of a past day as a current time are extracted, and the weight is calculated by computing differences between load data up to the current time of a current day and the extracted load data such that the weight decreases as the differences increase.

5. The energy management method of claim 4, wherein said extracting comprises increasing a time step for collection of the load data to decrease a number of samples of the load data in a first time period relative to a second time period that is between the first time period and the current time.

6. The energy management method of claim 4, wherein a cost of each operation schedule is simulated as the evaluated value, and the operation schedule that minimizes the cost is created.

7. A non-transitory computer-readable medium, storing a program executed by a computer to perform a method, the method comprising:
estimating a power generation amount of a power generation apparatus using a renewable energy;
estimating an energy demand of an electrical device of a customer;
creating an operation schedule of the electrical device based on the estimated power generation amount and energy demand; and
controlling the electrical device based on the operation schedule, wherein
the estimating an energy demand comprises:
extracting a plurality of load patterns including a plurality of different load data from load data accumulated in a storage unit configured to accumulate the load data representing a result of a load of the electrical device; and calculating a weight based on a predetermined standard for each of the extracted load patterns, and the creating comprises:

simulating, using a predetermined algorithm, an evaluated value of each operation schedule based on the extracted load pattern and the weight of the load pattern; and creating the operation schedule based on the evaluated value, wherein a plurality of load data for a predetermined period before and after the same time of a past day as a current time are extracted, and the weight is calculated by computing differences between load data up to the current time of a current day and the extracted load data such that the weight decreases as the differences increase.

8. The medium of claim 7, wherein said extracting comprises increasing a time step for collection of the load data to decrease a number of samples of the load data in a first time period relative to a second time period that is between the first time period and the current time.

9. The medium of claim 7, wherein a cost of each operation schedule is simulated as the evaluated value, and the operation schedule that minimizes the cost is created.

* * * * *